US008661434B1

(12) United States Patent
Liang et al.

(10) Patent No.: US 8,661,434 B1
(45) Date of Patent: Feb. 25, 2014

(54) MIGRATION OF COMPUTER SECURITY MODULES IN A VIRTUAL MACHINE ENVIRONMENT

(75) Inventors: Yung-Chang Liang, Cupertino, CA (US); Yi-Fen Chen, Pasadena, CA (US)

(73) Assignee: Trend Micro Incorporated, Tokyo (JP)

( * ) Notice: Subject to any disclaimer, the term of this patent is extended or adjusted under 35 U.S.C. 154(b) by 557 days.

(21) Appl. No.: 12/536,222

(22) Filed: Aug. 5, 2009

(51) Int. Cl.
G06F 9/455 (2006.01)

(52) U.S. Cl.
USPC .............. 718/1; 717/171; 717/172; 717/176; 709/220; 709/221

(58) Field of Classification Search
USPC ........ 718/1; 717/176, 171, 172; 709/220, 221
See application file for complete search history.

(56) References Cited

U.S. PATENT DOCUMENTS

| | | | | |
|---|---|---|---|---|
| 7,409,719 | B2 * | 8/2008 | Armstrong et al. | 726/24 |
| 8,146,082 | B2 * | 3/2012 | Belay | 718/1 |
| 2007/0079307 | A1 * | 4/2007 | Dhawan et al. | 718/1 |
| 2008/0155537 | A1 * | 6/2008 | Dinda et al. | 718/1 |
| 2008/0163207 | A1 * | 7/2008 | Reumann et al. | 718/1 |
| 2008/0222633 | A1 * | 9/2008 | Kami | 718/1 |
| 2009/0204964 | A1 * | 8/2009 | Foley et al. | 718/1 |
| 2010/0036913 | A1 * | 2/2010 | Imai | 709/205 |
| 2010/0071025 | A1 * | 3/2010 | Devine et al. | 726/1 |

OTHER PUBLICATIONS

Li et al., HyperMIP: Hypervisor controlled Mobile IP for Virtual Machine Live Migration across Networks, 2008, IEEE, pp. 80-88.*
Onoue et al., A Virtual Machine Migration System Based on a CPU Emulator, IEEE, VTDC 2006, pp. 1-8.*

VMware VMotion Live migration of virtual machines without service interuption, 2 sheets, webpage [online][retrieved on Jun. 3, 2009], retrieved from the Internet: http://www.vmware.com/files/pdf/vmotion_datasheet.pdf.
Hp Introduction to Virtual Machine Migration, 2 sheets, webpage [online][retrieved on Jun. 3, 2009], retrieved from the internet: http://docs.hp.com/en/T2767-90067/ch10s01.html.
Interop Labs What is Cisco NAC?, 2 sheets, [retrieved on Jun. 3, 2009], retrieved from the internet: http://www.interop.com/archive/pdfs/2007-06WhatIsCiscoNAC.pdf.
VMware VSphere Live migration of virtual machines, 2 sheets, webpage [online][retrieved on Jun. 3, 2009], retrieved from the internet: http://www.vmware.com/products/vi/vc/vmotion.html.
Cisco Systems—Cisco Network Admission Control (NAC), 2 sheets, webpage [online][retrieved on Jun. 3, 2009], retrieved from the internet: http://www.cisco.com/en/US/netsol/ns466/networking_solutions_package.html.
Cisco NAC Appliance—Wikipedia, the free encyclopedia, 5 sheets [retrieved on Jun. 3, 2009], retrieved from the internet: http://en.wikipedia.org/wiki/Clean_Access_Agent.
Microsoft About NAP (Windows), 1 sheet, webpage [online][retrieved on Jun. 3, 2009], retrieved from the internet: http://msdn.microsoft.com/en-us/library/aa369143(VS.85).aspx.

* cited by examiner

Primary Examiner — Meng An
Assistant Examiner — Abu Ghaffari
(74) Attorney, Agent, or Firm — Okamoto & Benedicto LLP

(57) ABSTRACT

A machine in the form of a computer is configured to run virtual machines. A virtual machine migrated from another computer is run in the computer. A security profile of the migrated virtual machine in the computer indicates a configuration setting of another network component in another computer network. A network profile in the computer indicates a configuration setting of a network component in the current computer network. The security profile of the migrated virtual machine is automatically updated to reflect the configuration setting of the network component in the current computer network to provide computer security function in the current computer network.

6 Claims, 4 Drawing Sheets

US 8,661,434 B1

MIGRATION OF COMPUTER SECURITY MODULES IN A VIRTUAL MACHINE ENVIRONMENT

BACKGROUND OF THE INVENTION

1. Field of the Invention

The present invention relates generally to computer security, and more particularly but not exclusively for securing computers running virtual machines.

2. Description of the Background Art

A virtual machine is a software implementation of a machine, which is computer hardware in this case, and executes programs like a real machine. Virtual machines in the art of computer science, in general, are well known. Virtualization allows several virtual machines to run on single computer hardware. Each virtual machine is, in essence, a separate computer (albeit a virtual one) and may have its own operating system, application programs, and security modules that are separate from other virtual machines running on the same computer hardware. The security module may provide antivirus, antispam, personal firewall, network security, and other computer security functions. Embodiments of the present invention provide a machine and associated method performed by the machine to allow for efficient migration of virtual machines having security modules.

SUMMARY

In one embodiment, a machine in the form of a computer is configured to run virtual machines. A virtual machine migrated from another computer is run in the computer. A security profile of the migrated virtual machine indicates a configuration setting of another network component in another computer network. A network profile in the computer indicates a configuration setting of a network component in the current computer network. The security profile of the migrated virtual machine is automatically updated to reflect the configuration setting of the network component in the current computer network to provide computer security function.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
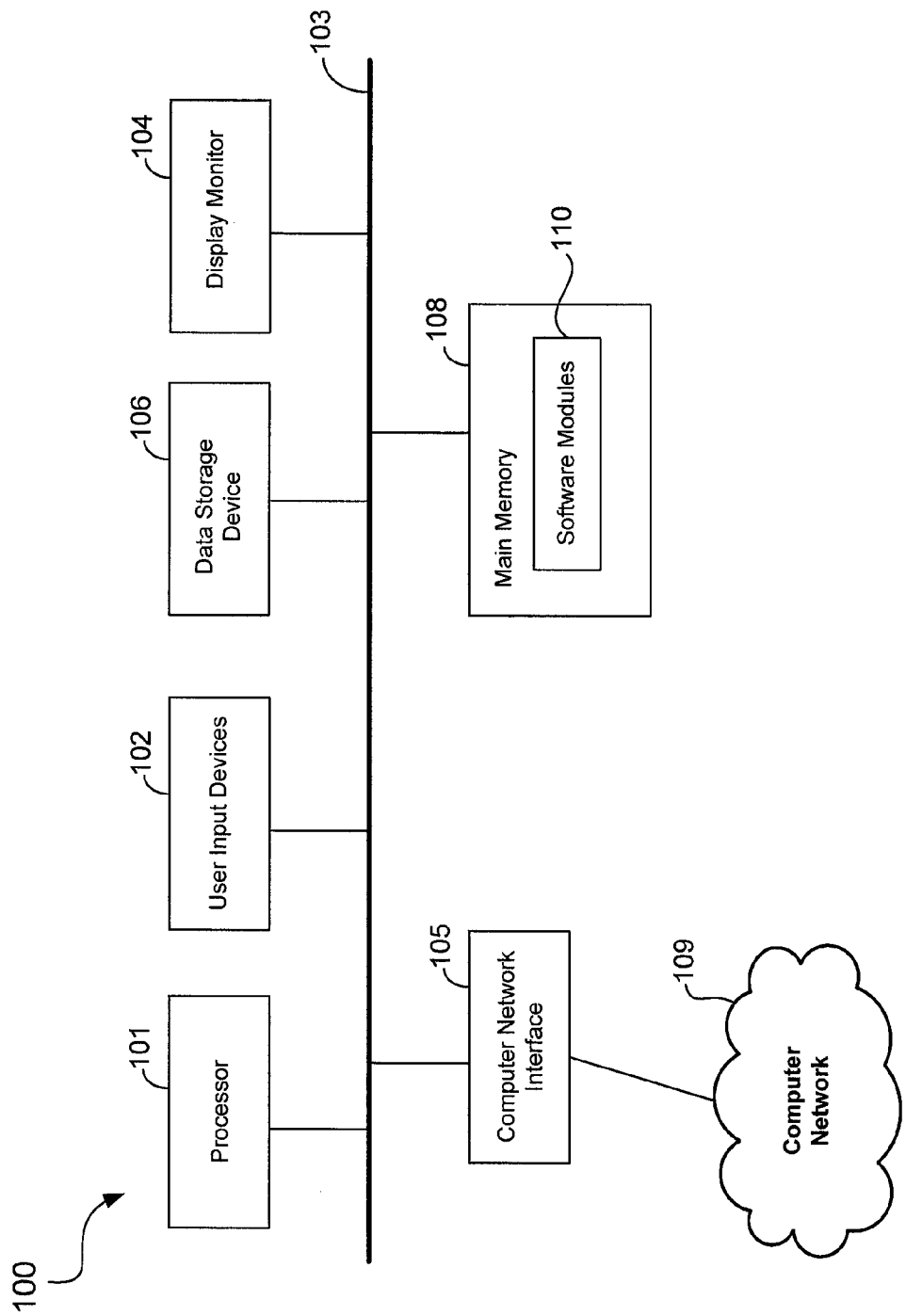
FIG. 1 shows a schematic diagram of a machine in the form of computer hardware in accordance with an embodiment of the present invention.

FIG. 1 shows a schematic diagram of a machine in the form of a computer hardware 100 ("computer 100") in accordance with an embodiment of the present invention. The computer 100 may be employed as computer hardware 200 or 400 (see FIG. 4). The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. The software modules 110 may comprise software components of the computer 100, such as virtual machines.

Figure 2:
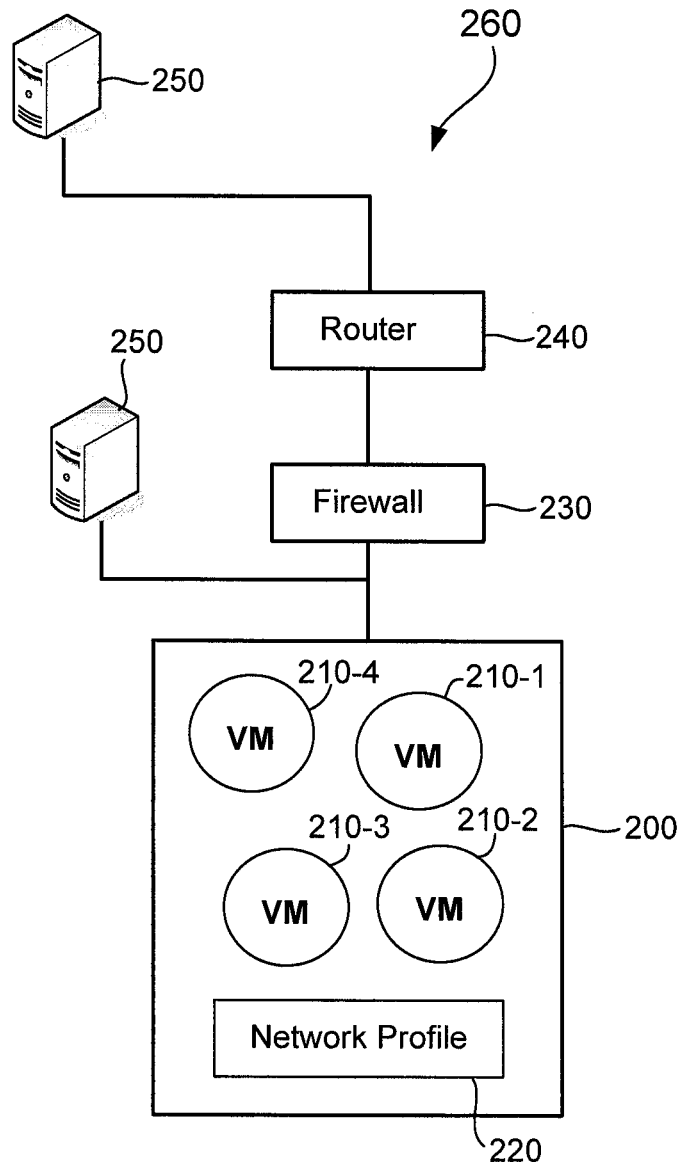
FIG. 2 schematically shows computer hardware in accordance with an embodiment of the present invention.

FIG. 2 schematically shows computer hardware 200 ("computer 200") in accordance with an embodiment of the present invention. In the example of FIG. 2, the computer 200 is coupled to a computer network 260 having network components including a firewall 230, a router 240, and one or more computer hardware 250.

A firewall 230 and a router 240 may comprise computer hardware running software components to provide firewall functionality and routing functionality, respectively.

The computer 200 runs a plurality of virtual machines 210 (i.e., 210-1, 210-2, 210-3, and 210-4). Because each virtual machine has its own operating system, the computer 200 runs a plurality of separate operating systems at the same time. The virtual machines 210 may be implemented using commercially available virtualization technology, such as those available from VMware, Inc. of Palo Alto, Calif.

A network profile 220 may comprise hardware, software, or firmware that provides information about configurations, topology, addresses, computer security, and other settings on the network 260. In one embodiment, the network profile 220 includes computer security configuration for the firewall 230. For example, the network profile 220 may indicate which ports of the firewall 230 are left open for use by the security module 213 (or other programs) to connect to other computers to perform its function. The network profile 220 may also indicate basic network settings, such as gateway/router IP (Internet Protocol) addresses, IP settings, DNS IP addresses, AD IP addresses, the network address of the firewall 230, and addresses of certain network components on the network 260 (e.g., DHCP server).

Figure 3:
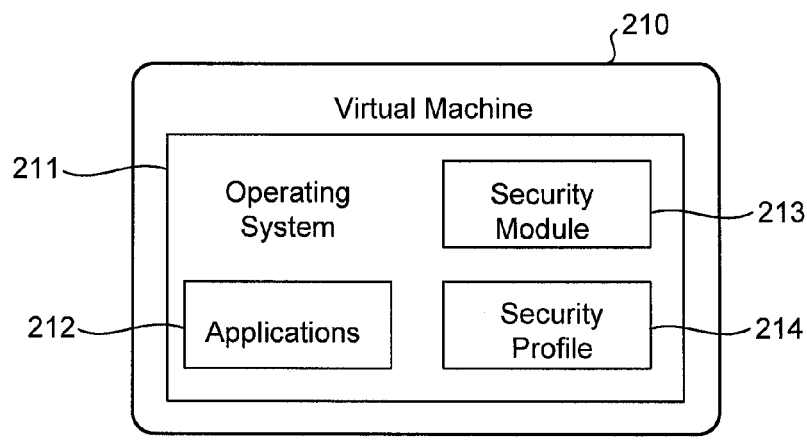
FIG. 3 schematically shows a virtual machine in accordance with an embodiment of the present invention.

FIG. 3 schematically shows a virtual machine in accordance with an embodiment of the present invention. In the example of FIG. 3, a virtual machine 210 (i.e., 210-1, 210-2, 210-3, or 210-4) includes applications 212, a security module 213, and a security profile 214 running on an operating system 211. The operating system 211 may comprise a commercially-available operating system, while the applications 212 may comprise application programs.

The security module 213 may comprise computer-readable program code configured to provide computer security functions, such as antivirus, antispam, and network security. The security module 213 may be implemented using a commercially-available computer security product, such as those from Trend Micro, Inc.

The security profile 214 may comprise information indicating the settings of the security module 213. In one embodiment, the security profile 214 indicates configuration information needed by the security module 214 to perform its computer security function. For example, the security profile 214 may indicate the open ports of the firewall 230, the roles of the virtual machine (e.g., web server application server, database server, etc.), firewall rules setting (e.g., port numbers to allow access, access control lists, etc.), general security settings (e.g., auto-update ON/OFF), security module settings (e.g., what security modules are installed), and security posture (e.g., anti-virus engine and pattern version), and so on. In one embodiment, the security module 213 or another module running in the virtual machine 210 may be configured to automatically indicate in the security profile 214 the network profile of the computer the virtual machine 210 is running on. This allows for efficient migration of the virtual machine 210 to run on other computers on different computer networks.

The security profile 214 and the network profile 220 may be changed to reflect the latest information while the virtual machine is off-line (i.e., without bringing up the virtual machine). This advantageously allows the virtual machine to be secured as soon as it is brought up to be on-line, and reduces the vulnerability window between bringing up the virtual machine online and updating the security module 213 (e.g., to have the latest virus patterns).

Figure 4:
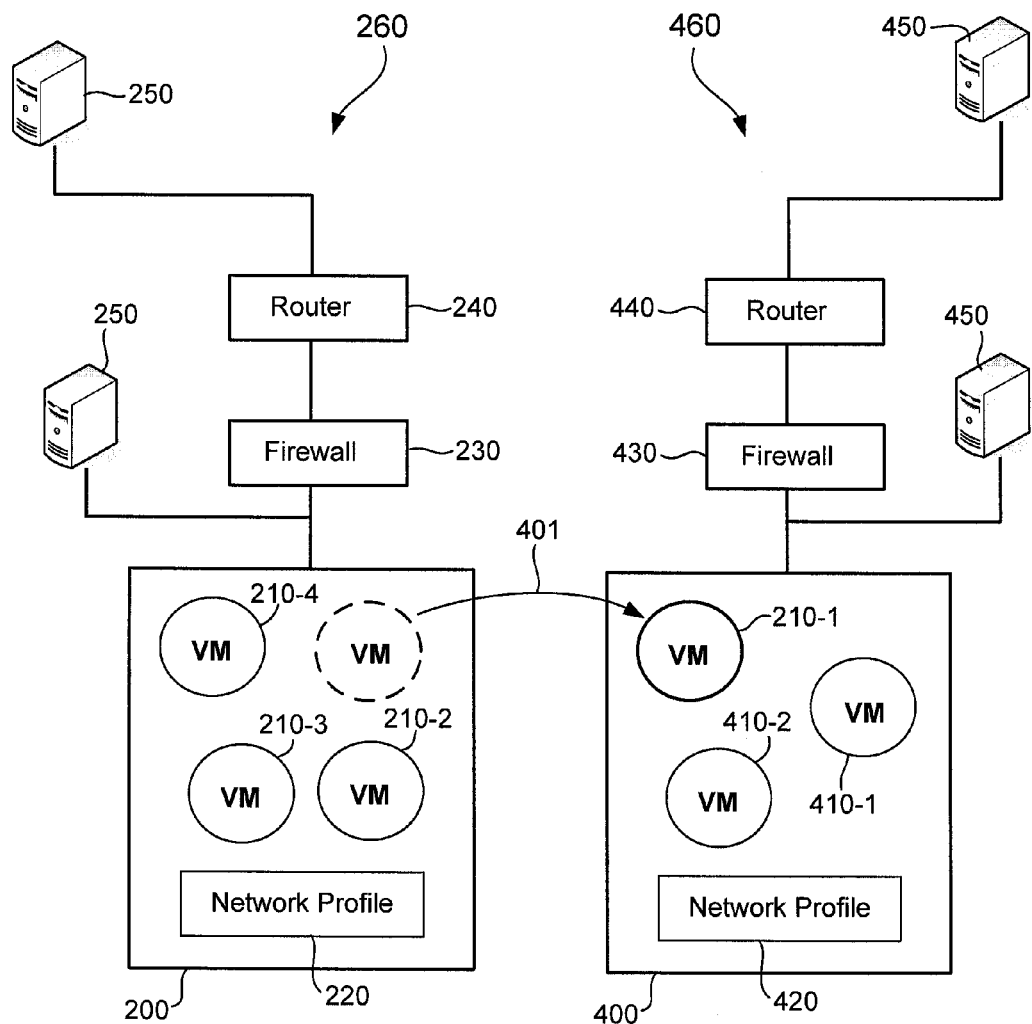
FIG. 4 schematically illustrates migration of a virtual machine from one computer in one network to another computer in another network in accordance with an embodiment of the present invention.

FIG. 4 schematically illustrates movement of a virtual machine from one computer in one network to another computer in another network in accordance with an embodiment of the present invention. In the example of FIG. 4, the virtual machine 210-1 is migrated from the computer 200 (see arrow 401) in the computer network 260 to a computer hardware 400 ("computer 400") in a computer network 460. The network 260 and network 460 may comprise non-contiguous networks. Similar to the network 260, the network components on the network 460 include a firewall 430, a router 440, and computers 450.

Like the computer 200, the computer 400 runs a plurality of virtual machines 410 (i.e., 410-1, 410-2) and the virtual machine 210-1. The computer 200 also includes a network profile 420, which is the same as the network profile 220 except that the network profile 420 reflects information about the network 460.

The virtual machine 210-1 may have been moved from the computer 200 to the computer 400 for a variety of reasons, including hardware failure (e.g., network 260 is down or the computer 200 is off-line for maintenance), for example. Unlike an actual machine, a virtual machine can be moved from one network to another relatively easy because no physical hardware movement is required. However, moving a virtual machine may compromise computer security service in that the virtual machine may be operating in a different computer network environment.

Figure 5:
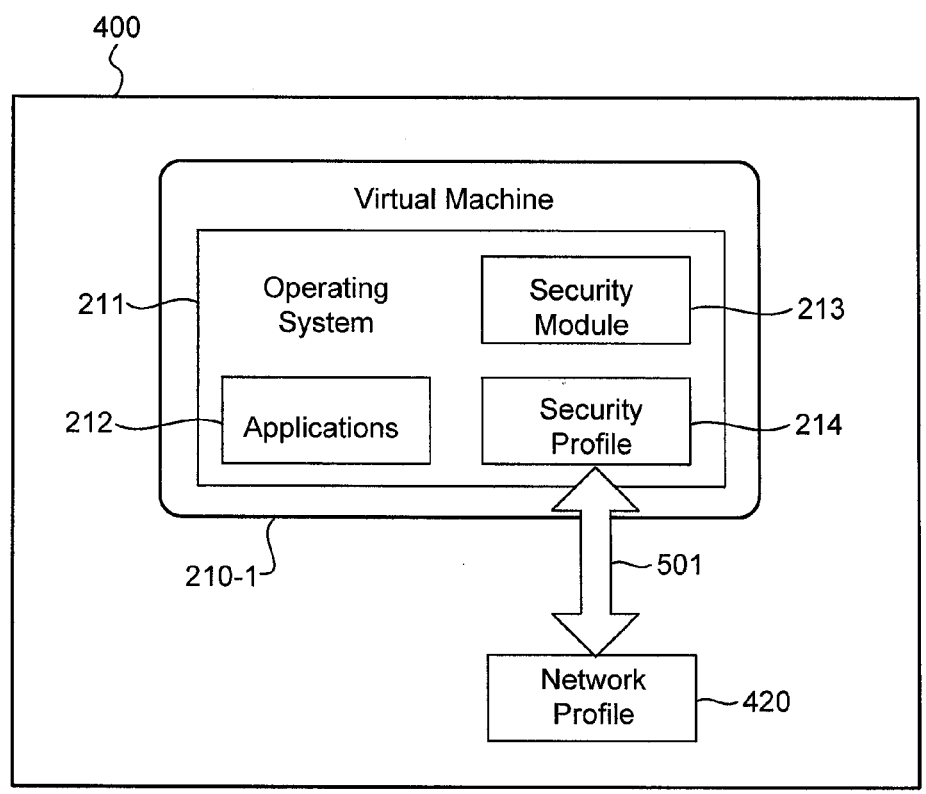
FIG. 5 schematically shows a virtual machine as migrated to run in another computer in accordance with an embodiment of the present invention.

FIG. 5 schematically shows the virtual machine 210-1 as migrated to run in the computer 400. The general functionality of the components of the virtual machine 210-1 has been previously described with reference to FIG. 3. In the example of FIG. 5, the security module 213 reads the network profile 420 (see arrow 501) to automatically (i.e., under program control rather than manually by a user or administrator) update the security profile 214 with information it needs to provide computer security functions upon execution in the computer 400. For example, the network profile 420 may indicate the ports of the firewall 430 (see FIG. 4) that are normally left open for use by security modules. In that case, the security profile 214 may be automatically updated with port information of the firewall 430, enabling the security module 213 to use the open ports of the firewall 430 to perform computer security function. The security module 213 may thus be readily migrated to the computer 100 without compromising security.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method comprising steps performed by a machine comprising a first computer, the method comprising:

running a plurality of virtual machines in the first computer, each of the plurality of virtual machines having its own operating system, the first computer being coupled to a first computer network having a first firewall;

running a migrated virtual machine in the first computer, the migrated virtual machine having been migrated from a second computer in a second computer network having a second firewall to the first computer in the first computer network, the migrated virtual machine having an operating system separate from operating systems of other virtual machines in the plurality of virtual machines in the first computer, the migrated virtual machine including a security profile that indicates a port of the second firewall that is left open for use by a security module in the migrated virtual machine, the second firewall being accessible in the second computer network but not in the first computer network; and before bringing up the migrated virtual machine online in the first computer, automatically updating the security profile of the migrated virtual machine in the first computer to indicate a port of the first firewall that is left open for use by the security module in the migrated virtual machine in the first computer network to allow the security module to use the first firewall instead of the second firewall to provide a computer security function in the first computer network;

wherein the security profile of the migrated virtual machine is automatically updated in the first computer by reading a configuration setting of the first firewall from a network profile that is located in the first computer network and indicates a network configuration of the first computer network.

2. The method of claim 1 wherein the computer security function comprises antivirus.

3. A machine comprising a first computer, the first computer comprising a processor configured to perform steps by executing computer-readable program code in memory, the first computer running a plurality of virtual machines, a migrated virtual machine in the plurality of virtual machines having an operating system separate from operating systems of other virtual machines in the plurality of virtual machines, the migrated virtual machine comprising a security module and a security profile running on the operating system, the security profile being automatically updated with a configuration setting that indicates a port of a first firewall that is left open for use by the security module in a first computer network instead of a port of a second firewall in a second computer network when the migrated virtual machine is migrated from a second computer in the second computer network to the first computer in the first computer network before bringing up the migrated virtual machine online in the first computer, the second firewall being accessible in the second computer network but not in the first computer network, the security module in the migrated virtual machine being configured to use the port of the first firewall that is left open for use by the security module in the migrated virtual machine to provide a computer security function in the first computer network;

wherein the security profile of the migrated virtual machine is automatically updated in the first computer by reading a configuration setting from a network profile that is located in the first computer network and indicates a network configuration of the first computer network.

4. The machine of claim 3 wherein the computer security function comprises antivirus.

5. A method comprising steps performed by a machine comprising a first computer, the method comprising:

running a plurality of virtual machines in the first computer, each of the plurality of virtual machines having its own operating system, the first computer being coupled to a first computer network having a first firewall; and automatically updating a security profile of a migrated virtual machine in the first computer before the migrated virtual machine is brought up online in the first computer, the security profile of the migrated virtual machine being updated to indicate a port of the first firewall that is left open for use by a security module in the migrated virtual machine to allow the security module to use the first firewall instead of a second firewall in a second computer network to perform a computer security function in the first computer network, the migrated virtual machine having been migrated from a second computer in the second computer network to the first computer in the first computer network, the second firewall being accessible in the second computer network but not in the first computer network, the migrated virtual machine having an operating system separate from operating systems of other virtual machines in the plurality of virtual machines;

wherein the security profile of the migrated virtual machine is automatically updated in the first computer by reading a configuration setting of the first firewall from a network profile that is located in the first computer network and indicates a network configuration of the first computer network.

6. The method of claim 5 wherein the computer security function comprises antivirus.

* * * * *